United States Patent
Sun et al.

(10) Patent No.: US 12,542,328 B2
(45) Date of Patent: Feb. 3, 2026

(54) BATTERY PACK, VEHICLE, AND ENERGY STORAGE DEVICE

(71) Applicant: BYD COMPANY LIMITED, Guangdong (CN)

(72) Inventors: Huajun Sun, Shenzhen (CN); Yan Zhu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 579 days.

(21) Appl. No.: 17/991,693

(22) Filed: Nov. 21, 2022

(65) Prior Publication Data

US 2023/0079318 A1   Mar. 16, 2023

Related U.S. Application Data

(63) Continuation of application No. PCT/CN2021/095500, filed on May 24, 2021.

(30) Foreign Application Priority Data

May 25, 2020   (CN) .......................... 202010447953.8

(51) Int. Cl.
*H01M 50/289*  (2021.01)
*B60L 50/64*  (2019.01)
(Continued)

(52) U.S. Cl.
CPC .......... *H01M 50/289* (2021.01); *B60L 50/64* (2019.02); *H01M 50/121* (2021.01); *H01M 50/124* (2021.01); *H01M 50/211* (2021.01); *H01M 50/249* (2021.01); *H01M 50/271* (2021.01); *H01M 50/51* (2021.01); *H01M 50/512* (2021.01); *H01M 2220/20* (2013.01)

(58) Field of Classification Search
CPC ............ H01M 50/289; H01M 50/249; H01M 50/121; H01M 50/124; H01M 50/211; H01M 50/51; H01M 50/512; H01M 50/271; H01M 2220/20
See application file for complete search history.

(56) References Cited

U.S. PATENT DOCUMENTS

2016/0252937 A1   9/2016   Yoshida et al.

FOREIGN PATENT DOCUMENTS

| CN | 209217069 U | 8/2019 |
| CN | 209658292 U | 11/2019 |

(Continued)

OTHER PUBLICATIONS

International Search Report and Written Opinion for Application No. PCT/CN2021/095500, mailed on Aug. 26, 2021, 13 pages.

*Primary Examiner* — Jane J Rhee
(74) *Attorney, Agent, or Firm* — Sheppard Mullin Richter & Hampton LLP (57) ABSTRACT

This application provides a battery pack, a vehicle, and an energy storage device. The battery pack includes at least one battery sequence. The battery sequence includes a plurality of batteries. A thickness of each battery extends along a first direction. The plurality of batteries are successively arranged along the first direction to form the battery sequence. At least one of the batteries includes a casing and a core packaged in the casing. A gap exists between at least two neighboring batteries. A ratio of the gap to the thickness of the battery is c, and c satisfies the following relational expression: $c/a=0.01–0.5$, where a represents an expansion rate of the battery.

20 Claims, 3 Drawing Sheets

(51) Int. Cl.
*H01M 50/121* (2021.01)
*H01M 50/124* (2021.01)
*H01M 50/211* (2021.01)
*H01M 50/249* (2021.01)
*H01M 50/271* (2021.01)
*H01M 50/51* (2021.01)
*H01M 50/512* (2021.01)

(56) References Cited

FOREIGN PATENT DOCUMENTS

| | | |
|---|---|---|
| CN | 110828717 A | 2/2020 |
| CN | 110828744 A | 2/2020 |
| CN | 110828745 A | 2/2020 |
| CN | 110828746 A | 2/2020 |
| CN | 111354899 A | 6/2020 |
| CN | 111354900 A | 6/2020 |
| CN | 212625802 U | 2/2021 |
| EP | 3641006 A1 | 4/2020 |

BATTERY PACK, VEHICLE, AND ENERGY STORAGE DEVICE

CROSS-REFERENCE TO RELATED APPLICATIONS

The application is a continuation application of International Patent Application No. PCT/CN2021/095500 filed with the China National Intellectual Property Administration (CNIPA) on May 24, 2021, which is based on and claims priority to and benefits of Chinese Patent Application Serial No. 202010447953.8, entitled "BATTERY PACK, BATTERY MODULE, VEHICLE, AND ENERGY STORAGE DEVICE", filed by BYD Company Limited on May 25, 2020. The entire content of the above-referenced applications is incorporated herein by reference.

FIELD

This application relates to the field of battery technologies, and particularly to a battery pack, a vehicle, and an energy storage device.

BACKGROUND

As the energy density of battery packs for electric vehicles is increasing, long service life is one of the difficulties that need to be overcome, which is also a very important indicator that affects user experience, and is a goal that various battery companies and new energy automobile companies have been pursuing. In a battery pack, the electrochemical system affects the service life of the battery. In addition, the external environment also has a crucial impact on the service life of the battery. Among others, the battery may expand during the cycle, and neighboring batteries squeeze each other after expansion, resulting in deterioration of battery performance, or even leading to safety issues in severe cases.

In the related art, in order to alleviate battery expansion, most of current researches focus on reserving a certain gap between neighboring batteries in the battery pack/battery module. However, the gap occupies the internal space of the battery pack. If the number of batteries in the battery pack is relatively large, the gap reserved is too large, and a gap needs to be reserved between every two neighboring batteries, the space utilization of the battery pack will inevitably be significantly reduced. However, if the gap reserved is too small, the battery expansion cannot be effectively alleviated. Therefore, how to reasonably design the gap between neighboring batteries to alleviate battery expansion without occupying too much internal space of the battery pack so as to maximize the overall performance of the battery pack is an urgent problem to be solved at present.

SUMMARY

In order to solve at least one of the above-mentioned problems, an objective of this application is to provide a battery pack, which not only can alleviate battery expansion and prolong the cycle life of the battery, but also makes full use of the internal space of the battery pack.

To achieve the above objective, according to a first aspect of this application, a battery pack is provided, including at least one battery sequence, where the battery sequence includes a plurality of batteries; a thickness of each battery extends along a first direction; and the plurality of batteries are successively arranged along the first direction to form the battery sequence; and at least one of the batteries includes a casing and a core packaged in the casing, a gap exists between at least two neighboring batteries, a ratio of the gap to the thickness of the battery is c, and c satisfies the following relational expression:

$c/a = 0.01 - 0.5$, where a represents an expansion rate of the battery.

In some implementations of this application, a gap exists between any two neighboring batteries of the batteries.

In some implementations of this application, the gap between the two neighboring batteries is a distance between the two neighboring batteries in the same battery sequence.

In some implementations of this application, a represents an expansion rate of the battery in the first direction.

In some implementations of this application, $a = $ (thickness of the battery after expansion − thickness of the battery before expansion) / thickness of the battery before expansion × 100%.

In some implementations of this application, the thickness of the battery before expansion is an initial thickness of the battery before use, and the thickness of the battery after expansion is a thickness measured when a capacity of the battery decreases to 80% or less of an initial capacity.

In some implementations of this application, the casing includes a casing body having an opening and a cover plate, the cover plate is connected to the opening of the casing body to jointly define a sealed accommodating cavity, and the core is located inside the accommodating cavity;
the thickness of the battery before expansion is a dimension of the cover plate along the first direction; and
the thickness of the battery after expansion is a minimum of a spacing between two imaginary parallel planes sandwiching the battery along the first direction.

In some implementations of this application, the gap between two neighboring batteries is a gap between the two neighboring batteries during work or after work or before use; and the thickness of the battery is an initial thickness of the battery before use.

In some implementations of this application, the casing includes a casing body having an opening and a cover plate, the cover plate is connected to the opening of the casing body to jointly define a sealed accommodating cavity, and the core is located inside the accommodating cavity; and
the gap between two neighboring batteries includes a first gap, the first gap is a minimum distance between two cover plates, which are located on the same side, of the two neighboring batteries, and the thickness of the battery is a dimension of the cover plate along the first direction.

In some implementations of this application, the casing includes a casing body having an opening and a cover plate, the cover plate is connected to the opening of the casing body to jointly define a sealed accommodating cavity, and the core is located inside the accommodating cavity;
the casing has two opposite first surfaces along the first direction; and
the gap between two neighboring batteries includes a second gap, and the second gap is a minimum spacing between two first surfaces, which are opposite to each other, of casings of the two neighboring batteries; and the thickness of the battery is a dimension of the cover plate along the first direction.

In some implementations of this application, a second gap of the battery before use is greater than a second gap of the battery after use.

In some implementations of this application, a has a value in the range of 5.8%-17.5%.

In some implementations of this application, a length of the battery extends along the second direction, and the length of the battery is 400-2500 mm; and the second direction is different from the first direction.

In some implementations of this application, a plurality of cores are packaged in the casing, the plurality of cores are divided into several core groups, and the core groups are connected in series.

In some implementations of this application, a plurality of cores in a same core group are connected in parallel.

In some implementations of this application, a packaging film is sleeved outside each of the core groups, and the plurality of core groups are connected in series.

In some implementations of this application, a packaging film is further disposed between the casing and the core, and the core is packaged in the packaging film.

In some implementations of this application, when the thickness of the battery after expansion is measured, an average thickness of the battery is calculated, where n points on the casing body of the battery 100 are randomly selected according to a certain interval, thicknesses at the n points are respectively measured and recorded as $d1, d2, d3, \ldots dn$, and the thickness of the battery after expansion is $d=(d1+d2+d3+ \ldots dn)/n$.

According to a second aspect of this application, a vehicle is provided, including the above battery pack.

According to a third aspect of this application, an energy storage device is provided, including the above battery pack.

By means of the above technical solutions, the beneficial effects obtained in this application are as follows: To provide a buffer space for battery expansion, a gap is reserved between neighboring batteries in this application, factors such as the expansion rate of the battery are considered. By taking into consideration the above factors, the design of the gap between the batteries will be more scientific and reasonable. The reservation of the gap can prevent the gap between batteries from being too large to waste the space of the battery pack and from being too small to fail in providing a buffering effect. As such, the service life of the battery pack can be prolonged while improving the space utilization of the battery pack.

DETAILED DESCRIPTION

This application provides a battery pack 200. The battery pack 200 includes at least one battery sequence 201. The battery sequence 201 includes a plurality of batteries 100. A thickness of each battery 100 extends along a first direction A. The plurality of batteries 100 are successively arranged along the first direction to form the battery sequence 201. At least one of the batteries 100 includes a casing 101 and a core 102 packaged in the casing 101. A gap exists between at least two neighboring batteries 100. A ratio of the gap to the thickness of the battery 100 is c, and c satisfies the following relational expression: $c/a=0.01-0.5$, where a represents an expansion rate of the battery 100.

In this application, the battery pack 200 may include one or more battery sequences 201. When a plurality of battery sequences 201 are included, the plurality of battery sequences 201 are connected in series to form the battery pack 200. Each battery sequence 201 includes two or more batteries 100. In production, the number of batteries 100 and the number of battery sequences 201 can be set according to actual needs, which is not limited in this application.

That a thickness of each battery 100 extends along the first direction A and the plurality of batteries 100 are successively arranged along the first direction A can be understood as: in at least one battery sequence 201, a plurality of batteries 100 are arranged along the thickness direction thereof, and two opposite surfaces of the battery 100 in the thickness direction have the largest area. The arrangement of the batteries 100 along the thickness direction means that the batteries 100 are successively arranged with large surfaces thereof facing toward each other. Because the surface with a larger area is more likely to expand, a certain gap reserved between the batteries 100 can provide a buffer space for the expansion of the batteries 100.

When the battery 100 expands, heat is generated. When a certain gap is reserved between the batteries 100, the gap can also serve as a heat dissipation channel, such as an air duct. The larger surface of the battery 100 has a better heat dissipation effect, which can further improve the heat dissipation efficiency of the battery pack 200 or the battery module, thereby improving the safety performance of the battery pack 200.

In the above solution, the reservation of the gap between two neighboring batteries 100 can be understood as that no mechanical member is disposed between the batteries 100 and only a certain space is reserved, or can be understood as that another mechanical member is disposed between two neighboring batteries 100 so that one battery 100 is separated from the other battery 100 by the mechanical member.

It should be noted that when a mechanical member is disposed between two neighboring batteries 100, the gap between the batteries 100 should be understood as a distance between the batteries 100 on two sides of the mechanical member, rather than a spacing between the mechanical member and the battery 100.

It should be noted that a mechanical member may be spaced apart from the batteries 100 on two sides of the mechanical member by a certain gap or may be in direct contact with the batteries 100. When the mechanical member is in direct contact with the batteries 100 on the two sides thereof, the mechanical member should have a certain degree of flexibility, which can provide a buffering effect for expansion of the batteries 100.

The mechanical member includes but is not limited to aerogel, a thermally conductive structural adhesive or a heat insulation foam.

In this application, when the battery pack 200 includes a plurality of battery sequences 201, the gap between two neighboring batteries 100 should refer to a spacing between two neighboring batteries 100 in the same battery sequence 201, rather than a spacing between two neighboring batteries 100 from two different battery sequences 201. Of course, the gap between two neighboring batteries 100 from different battery sequences 201 can also be set with reference to the above relational expressions, which is not limited in this application.

In the same battery sequence 201, a certain gap may be reserved between every two neighboring batteries 100, or a certain gap may be reserved between some of the neighboring batteries 100.

It should be noted that the gap between two neighboring batteries 100 changes with the increase of the operating time of the batteries 100, but whether in operation, after operation or before the batteries 100 leave the factory, all technical solutions where the gap between two neighboring batteries 100 satisfies the above relational expression shall fall within the protection scope of this application.

In this application, the battery 100 may be an all-solid-state battery or a gel polymer battery, and may be a liquid battery, a soft pack battery, or a square battery. The core 102 includes an electrode assembly formed by successively winding or stacking a positive electrode plate, a solid electrolyte layer and a negative electrode, or the core 102 includes a battery assembly formed by successively winding or stacking a positive electrode plate, a separator, and a negative electrode (where the core 102 further includes an electrolyte).

The expansion of the battery 100 is related to the thickness of the battery 100. The greater the thickness of the battery 100, the more likely the battery 100 is to expand. Therefore, the thickness of the battery 100 should be considered in the process of setting the gap between two neighboring batteries 100.

During the aging process of the battery 100, as the capacity of the battery 100 decreases, the thickness of the core 102 inside the casing 101 of the battery 100 gradually increases, which may lead to expansion of the battery. The expansion performance of the battery 100 varies with different electrochemical systems. The expansion rate a of the battery 100 characterizes the expansion performance of the battery 100. When the parameter a is larger, the expansion performance of the battery 100 is poorer (expansion easily occurs); and when the parameter a is smaller, the expansion performance of the battery 100 is better (expansion does not easily occur). The expansion performance of the battery 100 directly affects the service life of the battery 100, so the expansion performance of the battery 100 needs to be fully considered in the process of setting the gap between two neighboring batteries 100.

Once the battery 100 expands, gaps are formed between the positive electrode plate, the negative electrode plate and the separator inside the battery 100. As a result, the positive electrode plate, the negative electrode plate and the separator are no longer closely attached to each other, which increases the mass transfer resistance of lithium ions and is not conducive to the propagation of lithium ions. Therefore, the moderate squeezing between two neighboring batteries 100 has a shaping effect on the interface within the battery 100, which can ensure the close adhesion between the positive electrode plate, the separator and the negative electrode plate, reduce the mass transfer resistance of lithium ions, increase the transfer rate of lithium ions, promote the internal dynamics of the battery 100, and prolong the service life of the battery 100. The parameter t characterizes the effect of the expansion stress of the battery 100 in prolonging the service life of the battery 100.

The inventors of this application have found through experiments that when c/a is less than 0.01, the gap reserved between battery cores cannot meet a requirement for free expansion of the battery 100, which easily causes over-compression on the battery 100 and uneven stress on the casing 101 of the battery 100, and results in the occurrence of phenomena such as lithium plating and sharp drop of the capacity of the battery 100.

When c/a is greater than 0.5, the gap reserved between the battery cores is excessively large. Not only the space inside the battery pack 200/module is wasted and a group rate is reduced, but also a gap is easy to generate between inner electrode plates of the battery 100 due to expansion in long-time usage of the battery 100. If there is no force from a neighboring battery 100, the performance of the battery 100 is also affected.

The inventors of this application have found through experiments by comprehensively considering the above factors that when the ratio c of the gap between two neighboring batteries 100 to the thickness of the battery 100 is limited to the above range, the gap reserved between the batteries 100 can meet the requirements for free expansion of the battery 100. This not only prevents over-compression of neighboring batteries 100 to cause uneven stress on the casing 101 of the battery 100 and result in the occurrence of phenomena such as lithium plating and sharp drop of the capacity of the battery 100 and prolongs the cycle life of the battery 100; but also prevents the gap reserved between the batteries 100 from being too large to waste the arrangement space in the batteries 100 and reduce the volume utilization of the battery pack 200. In addition, the setting of the gap can also provide a moderate compression space between neighboring batteries 100, to ensure that the internal interface of the core 102 is more closely attached, enhance the lithium ion mass transfer capacity of the battery 100, and improve the overall performance of the battery 100.

Once the battery 100 expands, the volume of the battery 100 expand simultaneously in various directions such as the length, width, and thickness directions of the battery 100. The expansion rates and compression rates of the battery 100 and the core 102 in the directions are different. However, the expansion rates or compression rates of the battery 100 and the core 102, whether in the length direction, in the thickness direction or in the width direction, shall all fall within the scope of protection of this application as long as they satisfy the relational expressions provided in this application.

The two opposite surfaces of the battery 100 in the thickness direction have a larger area, and therefore experiences more significant expansion or shrinkage. Therefore, in an implementation of this application, a represents an expansion rate of the battery 100 in the thickness direction; and correspondingly, b represents an expansion rate of the core 102 in the thickness direction.

In some implementations of this application, a formula for calculating the expansion rate of the battery 100 in the thickness direction is:

$a=$(thickness of the battery after expansion−thickness of the battery before expansion)/thickness of the battery before expansion×100%;

a formula for calculating the ratio of the gap between two neighboring batteries 100 to the thickness of the battery 100 before expansion is:

$c=gap$ between two neighboring batteries/initial thickness of the battery before *use*.

In the above solution, the thickness of the battery 100 before expansion can be understood as the initial thickness of the battery 100 before use, and the thickness of the battery 100 after expansion can be understood as a thickness of the battery 100 after use.

"Before use" can be understood as that the battery 100 is waiting to leave the factory after the assembly is completed or has left the factory but has not yet begun to provide power to the outside. "After use" can be understood as that the battery 100 has provided power to the outside. For example, if the battery pack 200 is installed on an electric vehicle, the state before use can be understood as the state of a new vehicle; and the state after use should be a state after the vehicle has reached a certain mileage.

In some implementations, the thickness of the battery 100 after expansion is a thickness measured when the capacity of the battery 100 decreases to 80% or less of the initial capacity. When the capacity of the battery 100 decreases to 80% or less of the initial capacity, the battery 100 is at the end of its life cycle. At this moment, the charging capacity of the battery is the weakest, and the expansion force has the greatest impact. When the thickness measured when the capacity of the battery 100 decreases to 80% or less of the initial capacity meets the above relational expression, the normal operation of the battery 100 during the full life cycle can be ensured. Therefore, in this application, the thickness of the battery 100 after expansion is optionally a thickness measured when the capacity of the battery 100 decreases to 80% or less of the initial capacity.

In some implementations of this application, the casing 101 includes a casing body 1012 having an opening and a cover plate 1011, the cover plate 1011 is connected to the opening of the casing body 1012 to jointly define a sealed accommodating cavity, and the core 102 is located inside the accommodating cavity.

The casing body 1012 may have an opening at only one end thereof, and correspondingly there is only one cover plate 1011; or the casing body 1012 may have an opening at each of two ends thereof, and correspondingly there are two cover plates 1011.

In the above implementation, due to its high strength, the cover plate 1011 is less likely to expand than the casing body 1012. Even if a chemical reaction occurs inside the battery 100 after a period of operation, the expansion of the cover plate 1011 can be ignored. Therefore, the initial thickness of the battery 100 before expansion, i.e., the initial thickness of the battery 100 before use can be approximately equal to the dimension of the cover plate 1011 along the first direction A. In other words, the dimension of the cover plate 1011 along the thickness direction of the battery 100 is approximately equal to the thickness of the battery 100.

After the battery 100 is used for a period of time, the two opposite surfaces of the battery 100 in the thickness direction expand significantly. The closer to the center of the surface, the more significantly the battery 100 expands. At this moment, the thicknesses at different points on the battery 100 are not the same. In practice, to measure the thickness of the battery 100 after expansion, the following two measurement methods can be used:

Method 1: Calculate an average thickness of the battery 100, where n points on the casing body 1012 of the battery 100 are randomly selected according to a certain interval, thicknesses at the n points are respectively measured and recorded as d1, d2, d3, . . . dn, and the thickness of the battery 100 after expansion is d=(d1+d2+d3+ . . . dn)/n. In this method, the larger the value of n is, the smaller the error of the calculation result. optionally, n≥5.

Method 2: The thickness of the battery 100 after expansion can be understood as a minimum value of a spacing between two imaginary parallel planes sandwiching the battery 100 along the first direction A. In other words, a maximum distance between two opposite surfaces of the battery 100 in the thickness direction, i.e, the thickness at the position with the most significant expansion of the battery 100, is measured, which is approximately equal to the thickness of the battery 100 after expansion. In an actual test, two plates having flat surfaces may be used to clamp the two surfaces of the battery 100 in the first direction A respectively, the two plates are kept parallel to each other, and the distance between the two plates is recorded as the thickness of the battery 100 after expansion.

"Clamp" should be understood as that the plate just comes into contact with the surface of the casing body 1012 of the battery 100 and the plate does not exert any force on the casing body 1012, that is to say, the plate and the casing body 1012 do not compress each other.

The above two methods are for reference only. This application does not limit the method of testing the thickness of the battery 100 after expansion. In practical applications, other testing methods shall also fall within the scope of protection of this application as long as the thickness of the battery 100 after expansion measured using such methods satisfies the above relational expression.

In the core 102, the active material layer on the positive electrode plate or the negative electrode plate expands or shrinks during charging and discharging, which sometimes gives rise to the peeling or falling of the active material from the active material layer, resulting in an internal short circuit. In addition, the expansion and shrinkage of the above active material layer also breaks the close contact between the positive electrode plate, the negative electrode plate and the separator, affects the mass transfer of lithium ions, increases the internal resistance of the battery 100, and degrades the cycle performance of the battery 100. Therefore, in order to prevent the expansion and shrinkage of the active material layer, compressing the battery 100 a certain degree can prevent further expansion of the active material layer, which ensures that the positive electrode plate, the negative electrode plate and the separator are still closely attached in the case of expansion and does not affect the lithium ion mass transfer capacity, thereby improving the cycle performance of the battery 100.

Therefore, the gap between neighboring batteries 100 should not be as large as possible. A too large gap is not only detrimental to the improvement of the energy density of the battery pack 200, but also causes the cycle performance of the battery 100 to further deteriorate. It is obvious that the proper consideration of mutual compression between neighboring batteries 100 in the process of setting the gap between neighboring batteries 100 is beneficial to the cycle performance of the battery 100.

According to the battery pack 200 provided by this application, the casing 101 includes a casing body 1012 having an opening and a cover plate 1011, the cover plate 1011 is connected to the openings at two ends of the casing body 1012 respectively to jointly define a sealed accommodating cavity, and the core 102 is located inside the accommodating cavity.

The gap between two neighboring batteries 100 includes a first gap, the first gap is a minimum distance between two cover plates 1011, which are located on the same side, of the two neighboring batteries 100, and the thickness of the battery 100 is a dimension of the cover plate 1011 along the first direction A.

In the above implementation, due to its high strength, the cover plate 1011 is less likely to expand than the casing body 1012. Even if a chemical reaction occurs inside the battery 100 after a period of operation, the battery 100 expands to compress the neighboring battery 100, and the first gap changes (for example, gradually increases), the change is small and can be ignored, or even after the change, the ratio of the first gap to the thickness of the battery 100 still satisfies the above relational expression.

In the above implementation, two ends of the casing body 1012 are each provided with a cover plate 1011. When the batteries 100 are arranged to form a battery sequence 201 along the thickness direction, the gap between two batteries 100 refers to a minimum spacing between two cover plates at the same end of the battery sequence 201, rather than a spacing between two cover plates 1011 at different ends of the batteries 100.

In some implementations of this application, the casing 101 has two opposite first surfaces along the first direction A; the gap between two neighboring batteries 100 includes a second gap, and the second gap is a minimum spacing between two first surfaces, which are opposite to each other, of the casings 101 of the two neighboring batteries 100; and the thickness of the battery 100 is a dimension of the cover plate 1011 along the first direction A.

The gap of the battery 100 before use is greater than the second gap of the battery 100 after use.

"Before use" can be understood as that the battery 100 is waiting to leave the factory after the assembly is completed or has left the factory but has not yet begun to provide power to the outside. "After use" can be understood as that the battery 100 has provided power to the outside. For example, if the batteries are assembled into a battery pack 200 and installed on an electric vehicle, the state before use can be understood as the state of a new vehicle; and the state after use should be a state after the vehicle has reached a certain mileage.

In this implementation, the second gap is to refer to a minimum spacing between two first surfaces, which are opposite to each other, of the two neighboring batteries 100. The spacing gradually decreases with the increase of the use time of the battery 100, mainly because the spacing between two neighboring large surfaces gradually decrease after expansion of the battery 100.

According to the battery pack 200 provided by this application, a has a value in the range of 5.8%-17.5%, a case that a<5.8% is hardly to occur, which is decided by a characteristic of continuously increasing thickness of a negative solid electrolyte interface (SEI) film of a lithium battery, and according to existing test data, a case that a>17.5% also less occurs.

According to the battery pack 200 provided by this application, the length of the battery extends along the second direction B. The length of the battery 100 is 400-2500 mm. Further, the length of the battery 100 is 600-1000 mm. Still further, the length of the battery 100 is 1000 mm-2000 mm. Still further, the length of the battery 100 is 1300 mm-2200 mm.

This application is more suitable for a battery 100 with a length greater than 400 mm. Once the battery 100 expands and causes the casings 101 of two neighboring batteries 100 to come into contact, the contact part exerts a force on the battery 100 toward the core 102. The longer the battery 100 is, the longer the contact part between neighboring batteries 100 will be, as compared with short batteries 100 in the market. This is likely to give rise to uneven distribution of compression force toward the inner electrode plates in different areas of the battery 100 in the length direction. The uneven force distribution easily leads to lithium plating of the battery 100, leading to safety issues or sharp drop of the capacity of the battery 100.

In some implementations of this application, a plurality of cores 102 are packaged in the casing 101, the plurality of cores 102 are divided into several core groups, and the core 102 groups are connected in series.

In other words, a plurality of core 102 groups are connected in series in the casing 101, and each core 102 group includes at least one core 102. Compared with an existing method where only one core 102 is disposed, a battery 100 with a longer length can be manufactured more conveniently by arranging a plurality of core 102 groups in the battery 100. Under normal circumstances, once the battery 100 is long, the length of the copper and aluminum foils used as the current collector increases accordingly, which greatly increases the internal resistance of the battery 100 and cannot meet the increasing higher requirements on power and fast charging.

When the batteries 100 have the same length, this embodiment, by disposing a plurality of core 102 groups inside the casing 101, can also greatly reduce the internal resistance of the battery 100 to avoid problems caused by overheating of the battery 100 due to high power output, fast charging, etc. Meanwhile, the capacity of the battery 100 can be increased, and the manufacturing costs of the battery 100 can be reduced.

In some implementations of this application, a packaging film is further disposed between the casing 101 and the core 102, and the core 102 is packaged in the packaging film.

In other words, the core 102 is packaged in the packaging film first, and then the casing 101 is sleeved over the packaging film, thereby achieving secondary packaging of the core 102 and improving the sealing performance of the battery 100. It can be understood that an electrolyte is further injected into the packaging film. Therefore, by means of the above method, contact between the electrolyte and the casing 101 can also be avoided, so as to prevent corrosion of the casing 101 or decomposition of the electrolyte.

In the above solution, the packaging film can be integrally arranged, a plurality of cores 102 are packaged in the same packaging film, the cores 102 are divided into several core 102 groups, and each core 102 group includes at least one core 102. A plurality of cores 102 in the same core 102 group are connected in parallel, and the core 102 groups are connected in series, thereby increasing the capacity of the battery 100 and reducing the manufacturing costs.

There may be a plurality of packaging films. The core 102 group includes at least one core 102, each packaging film packages one core 102 group to form a core 102 assembly, and the core 102 assemblies are connected in series.

In other words, the packaging films of the plurality of core 102 groups are independent of each other, the number of packaging films corresponds one-to-one to the number of core 102 groups, and each core 102 group is separately packaged in one packaging film. In this implementation, after completion of the preparation of the plurality of core 102 groups, one packaging film may be sleeved over each core 102 group, and then the core 102 assemblies are connected in series.

In some embodiments, the material of the packaging film may include polypropylene (PP), polyethylene (PE) or a multilayer composite film.

For example, when the packaging film is a multilayer composite film, the packaging film may include a non-metal outer layer film and a non-metal inner layer film laminated together. The inner layer film is wrapped around an outer periphery of the core 102, and the outer layer film is wrapped on the non-metal inner layer film, that is, the inner layer film is located between the outer layer film and the core 102.

The inner layer film has good chemical stability, and for example, may be made of a material resistant to electrolyte corrosion, for example, one or a combination of more than one of polypropylene (PP), polyethylene (PE) or polyethylene terephthalate (PET).

The outer layer film is a protective layer. The outer layer film can prevent the penetration of air, especially water vapor, oxygen, etc., and may be made of a material such as one or a combination of more than one of polyethylene terephthalate, polyamide or polypropylene.

In the embodiments of this application, the melting point of the outer layer film is greater than the melting point of the inner layer film, so that the outer layer film will not melt during hot-melt sealing, and the inner film can melt in time to ensure excellent sealing performance. Further, the difference between the melting points of the outer layer film and the inner layer film may be 30-80° C., for example, 50° C. or 70° C. The specific material of the outer layer film and the inner layer film can be selected according to actual needs.

In the embodiments of this application, the non-metal outer layer film and the non-metal inner layer film are bonded with an adhesive. The adhesive can be specifically selected according to the properties of the non-metal outer layer film and the non-metal inner layer film. For example, a PP film and a PET film which are not quite compatible and are likely to delaminate are optionally bonded with a polyolefin adhesive to form a composite film.

In some other implementations, the packaging film may be an aluminum-plastic composite film.

In this application, the battery 100 may be a soft pack battery, and correspondingly, the casing 101 may be an aluminum-plastic film. Alternatively, the battery 100 may also be a hard-case cell, and correspondingly, the casing 101 is a metal casing. The metal casing includes but is not limited to an aluminum casing or a steel casing.

According to a second aspect of this application, a battery module is provided, including at least one battery sequence 201, where the battery sequence 201 includes a plurality of batteries 100; a thickness of each battery 100 extends along a first direction A, and the plurality of batteries 100 are successively arranged along the first direction A to form the battery sequence 201; and at least one of the batteries 100 includes a casing 101 and a core 102 packaged in the casing 101, a gap exists between at least two neighboring batteries 100, a ratio of the gap to the thickness of the battery 100 is c, and c satisfies the following relational expression: c/a=0.01-0.5, where a represents an expansion rate of the battery 100.

According to a battery module provided in this application, a represents an expansion rate of the battery 100 in the first direction A.

According to a battery module provided in this application, a=(thickness of the battery 100 after expansion−thickness of the battery 100 before expansion)/thickness of the battery 100 before expansion×100%.

According to a battery module provided in this application, the thickness of the battery 100 before expansion is an initial thickness of the battery 100 before use, and the thickness of the battery 100 after expansion is a thickness measured when a capacity of the battery 100 decreases to 80% or less of an initial capacity.

According to a battery module provided in this application, the casing 101 includes a casing body 1012 having an opening and a cover plate 1011, the cover plate 1011 is connected to the opening of the casing body 1012 to jointly define a sealed accommodating cavity, and the core 102 is located inside the accommodating cavity;

the thickness of the battery 100 before expansion is a dimension of the cover plate 1011 along the first direction A;

and the thickness of the battery 100 after expansion is a minimum value of a spacing between two imaginary parallel planes sandwiching the battery 100 along the first direction A.

According to a battery module provided in this application, the gap between two neighboring batteries 100 is a gap between the two neighboring batteries 100 before use; and the thickness of the battery 100 is an initial thickness of the battery 100 before use.

According to a battery module provided in this application, the casing 101 includes a casing body 1012 having an opening and a cover plate 1011, the cover plate 1011 is connected to the opening of the casing body 1012 to jointly define a sealed accommodating cavity, and the core 102 is located inside the accommodating cavity; and the gap between two neighboring batteries 100 includes a first gap, the first gap is a minimum distance between two cover plates 1011, which are located on the same side, of the two neighboring batteries 100, and the thickness of the battery 100 is a dimension of the cover plate 1011 along the first direction A.

According to a battery module provided in this application, the casing 101 has two opposite first surfaces along the first direction A; and the gap between two neighboring batteries 100 includes a second gap, and the second gap is a minimum spacing between two first surfaces, which are opposite to each other, of the casings 101 of the two neighboring batteries 100; and the thickness of the battery 100 is a dimension of the cover plate 1011 along the first direction A.

According to a battery module provided in this application, the second gap of the battery 100 before use is greater than the second gap of the battery 100 after use.

According to a battery module provided in this application, a has a value in the range of 5.8%-17.5%.

According to a battery module provided in this application, a length of the battery 100 extends along the second direction B, and the length of the battery 100 is 400-2500 mm; and the second direction B is different from the first direction A.

According to a battery module provided in this application, a plurality of cores 102 are packaged in the casing 101, the plurality of cores 102 are divided into several core 102 groups, and the core 102 groups are connected in series.

According to a battery module provided in this application, a packaging film is further disposed between the casing 101 and the core 102, and the core 102 is packaged in the packaging film.

The battery module provided by this application has a long service life and high safety performance.

According to a third aspect of this application, a battery pack 200 is provided, including the above battery module. The battery pack 200 provided by this application has a long service life, high safety performance and high space utilization.

Figure 6:
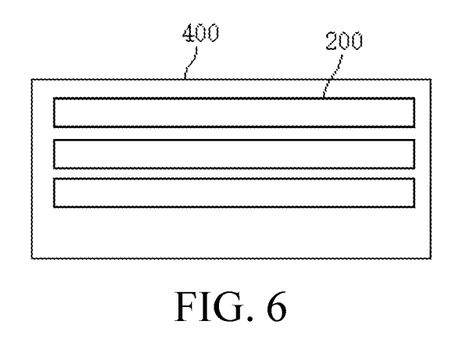
FIG. 6 is a schematic diagram in which a battery pack is disposed inside an energy storage device according to this application.

According to a fifth aspect of this application, as shown in FIG. 6, an energy storage device 400 is provided, including the above battery pack 200.

Figure 1:
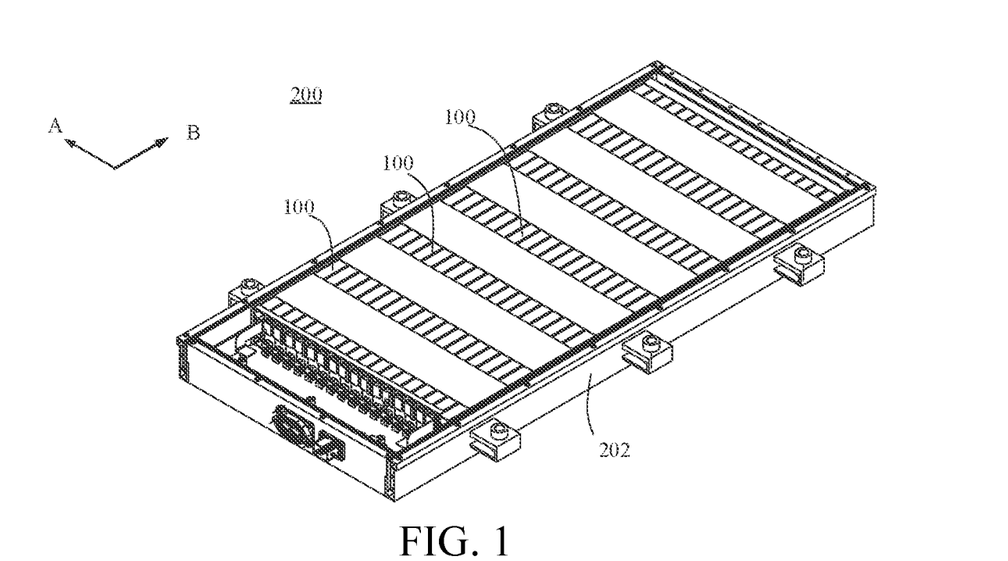
FIG. 1 shows a battery pack according to this application.
Figure 2:
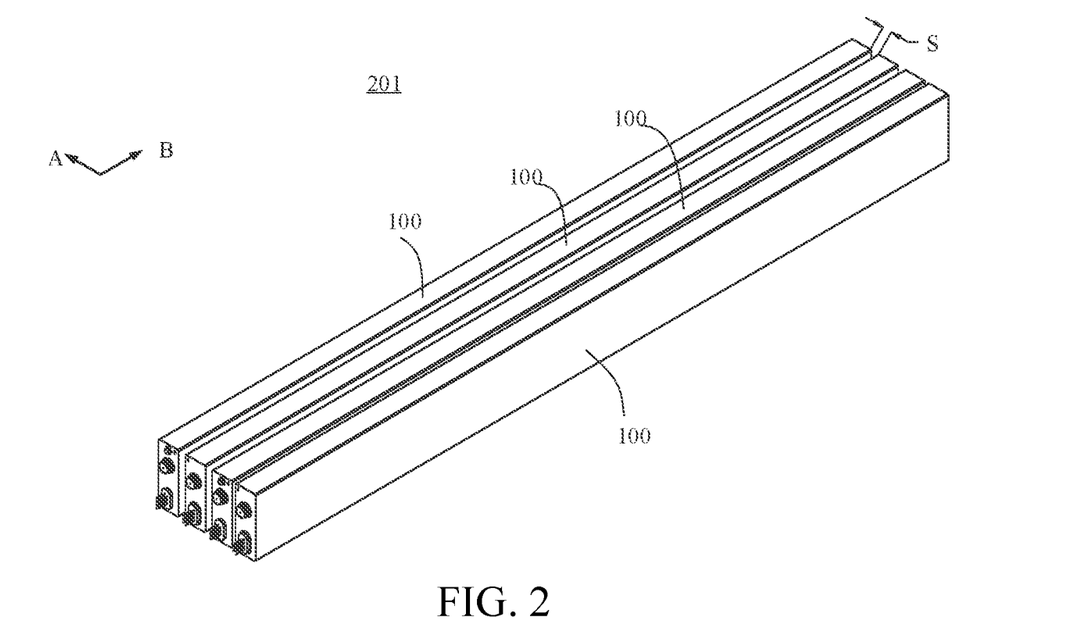
FIG. 2 shows a battery sequence according to this application.
Figure 3:
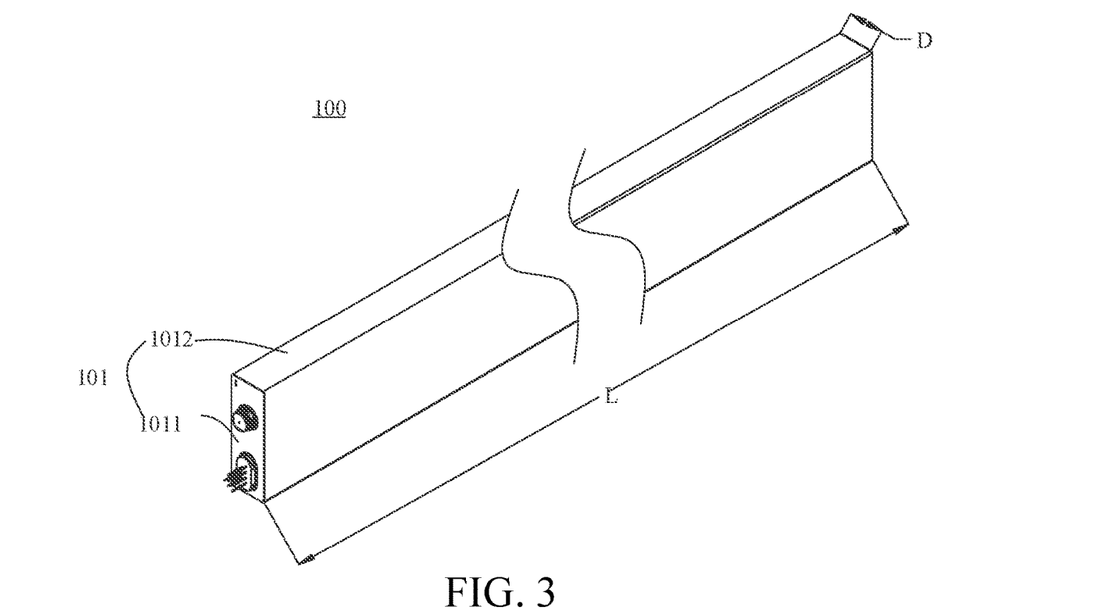
FIG. 3 shows a battery according to this application.
Figure 4:
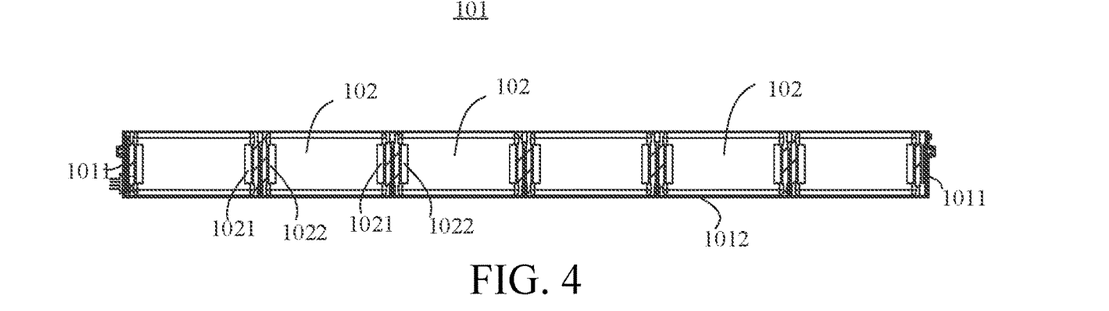
FIG. 4 is a cross-sectional view of a battery pack according to this application.
Figure 5:
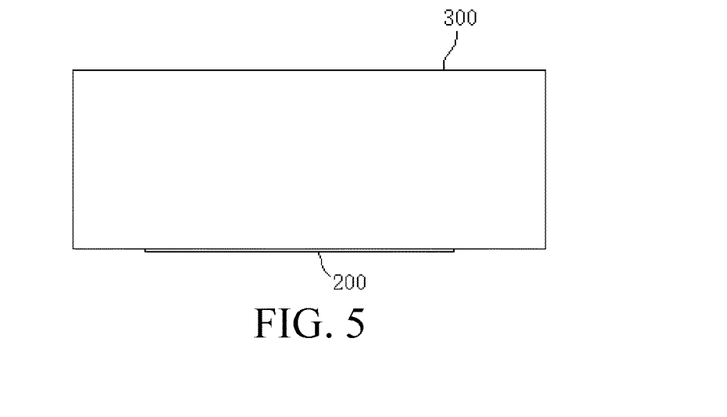
FIG. 5 is a schematic diagram of assembly between a vehicle and a battery pack according to this application.

According to a fourth aspect of this application, as shown in FIG. 5, a vehicle 300 is provided, including the above battery pack 200.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the terms in this application according to specific situations.

In description of this specification, description of reference terms such as "an embodiment", "specific embodiments", or "an example", means including specific features, structures, materials, or features described in the embodiment or example in at least one embodiment or example of this application. In this specification, exemplary descriptions of the foregoing terms do not necessarily refer to the same embodiment or example. In addition, the described specific features, structures, materials, or characteristics may be combined in a proper manner in any one or more of the embodiments or examples.

Although the embodiments of this application have been shown and described, a person of ordinary skill in the art should understand that various changes, modifications, replacements and variations may be made to the embodiments without departing from the principles and spirit of this application, and the scope of this application is as defined by the appended claims and their equivalents.

This application will be further described below in conjunction with specific embodiments. It should be understood that the cited embodiments are only used to illustrate this application and not to limit the scope of this application.

EXAMPLE 1

As shown in FIG. 1 to FIG. 4, a battery pack 200 includes a tray 201 and a battery sequence 201 located in the tray. The battery sequence 201 includes a plurality of batteries 100. A thicknesses of each battery 100 extends along a first direction A, and a length of each battery 100 extends along a second direction B. The plurality of batteries 100 are successively arranged along the first direction A to form the battery sequence 201. A gap S is provided between two neighboring batteries.

Each battery 100 includes an aluminum casing 101. The casing 101 includes a casing body 1012 having an opening at each of two ends thereof and two cover plates 1011. The cover plates 1011 are connected to the openings of the casing body 1012 to jointly define a sealed accommodating cavity, and the core 102 is located inside the accommodating cavity. There are a plurality of cores 102. Each core is packaged in a packaging film (not shown). Each core includes a positive tab 1021 and a negative tab 1022 for leading out a current. Along the length direction of the core, the positive tab 1021 and the negative tab 1022 are respectively arranged at two opposite ends of the core. The plurality of cores 102 are successively arranged along the length direction of the battery to form a core sequence. The positive tab 1021 of one core 102 of the two neighboring cores 102 is electrically connected to the negative tab of the other core 102, so that the plurality of cores 102 are connected in series.

1. Measurement Method of Related Parameters of Battery
(1) Measure the Expansion Rate of the Battery After the battery pack has been working for a period of time, the dimension of the cover plate 1011 of the battery 100 along the first direction A (the thickness direction of the battery) is measured and recorded as an initial thickness D of the battery before expansion, and a distance between two imaginary parallel planes sandwiching the battery along the thickness direction of the battery is measured (refer to Method 2 of measuring the thickness of the battery after expansion as described in the specification) and recorded as a thickness d1 of the battery after expansion. The expansion rate a of the battery=(d1−D)/D.

2. Cycle Performance Test of the Battery Pack

At 25° C., the batteries of the examples and comparative examples were subjected to full charge and discharge cycle test at a charge rate of 0.75 C and discharge rate of 0.75 C. The decrease of the capacity of each battery in the battery pack was recorded until the capacity of a battery decreased to 8000. The number of cycles was outputted. The voltage range of the positive electrode material being lithium iron phosphate is 2.5-3.8 V, and the voltage range of an Ni65 nickel-cobalt-manganese (NCM) ternary material is 3-4.2 V.

Table 1 presents parameters and performance test result of examples and comparative examples.

TABLE 1

| | Example 1 | Example 2 | Example 3 | Example 4 | Example 5 | Example 6 | Comparative Example 1 | Comparative Example 2 |
|---|---|---|---|---|---|---|---|---|
| Type of positive electrode material | Lithium iron phosphate | Lithium iron phosphate | Lithium iron phosphate | Ternary | Ternary | Ternary | Lithium iron phosphate | Ternary |
| Battery capacity | 140 Ah | 230 Ah | 100 Ah | 140 Ah | 230 Ah | 100 Ah | 140 Ah | 140 Ah |
| Battery level | 448 Wh | 736 Wh | 320 Wh | 511 Wh | 839.5 Wh | 365 Wh | 448 Wh | 511 Wh |
| Initial thickness D (mm) of battery | 13.50 | 54.00 | 50.00 | 22.80 | 66.00 | 37.00 | 13.50 | 22.80 |
| Thickness d1 (mm) of battery after expansion | 14.72 | 60.00 | 54.00 | 27.22 | 76.00 | 41.44 | 14.00 | 28.00 |
| Thickness increase Δd (mm) | 1.22 | 6.00 | 4.00 | 5.00 | 11.00 | 4.44 | 0.50 | 5.20 |
| Gap s (mm) | 0.40 | 0.40 | 0.50 | 0.50 | 0.40 | 0.35 | 0.30 | 0.05 |

TABLE 1-continued

|  | Example 1 | Example 2 | Example 3 | Example 4 | Example 5 | Example 6 | Comparative Example 1 | Comparative Example 2 |
|---|---|---|---|---|---|---|---|---|
| between two neighboring batteries |  |  |  |  |  |  |  |  |
| Expansion rate a of battery | 9.0000 | 11.1111 | 8.0000 | 21.9298 | 16.6667 | 12.0000 | 3.7037 | 22.8070 |
| C | 2.9630 | 0.7407 | 1.0000 | 2.1930 | 0.6061 | 0.9459 | 2.2222 | 0.2193 |
| c/a | 0.3292 | 0.0667 | 0.1250 | 0.1000 | 0.0364 | 0.0788 | 0.6000 | 0.0096 |
| Quantity of times of cycles (quantity of times of cycles when capacity decreases to 80% of initial capacity) | 2300 | 3400 | 2300 | 1300 | 1297 | 1390 | 709 | 357 |

It can be seen from the experimental data in the table that when the ratio of the gap between two neighboring batteries to the thickness of the battery falls within the range defined in this application, the service life of the battery was significantly increased, and either a too large or too small gap caused a decrease in the capacity of the battery.

What is claimed is:

1. A battery pack, comprising a plurality of batteries, wherein:
    a thickness of each battery extends along a first direction, and the plurality of batteries are successively arranged along the first direction to form a battery sequence,
    the batteries each comprise a casing and a core within the casing,
    a gap exists between two neighboring batteries and is configured to meet a requirement for free expansion of the battery, a ratio of the gap to the thickness of the battery is c, and c satisfies the following relational expression: c/a is greater than 0.15 and less or equal to 0.5, wherein a represents an expansion rate of the battery.

2. The battery pack according to claim 1, wherein a gap exists between any two neighboring batteries of the batteries.

3. The battery pack according to claim 1, wherein the gap between the two neighboring batteries is a distance between the two neighboring batteries in the same battery sequence.

4. The battery pack according to claim 1, wherein a represents an expansion rate of the battery in the first direction.

5. The battery pack according to claim 1, wherein $a$=(thickness of the battery after expansion−thickness of the battery before expansion)/thickness of the battery before expansion×100%.

6. The battery pack according to claim 5, wherein the thickness of the battery before expansion is an initial thickness of the battery before use, and the thickness of the battery after expansion is a thickness measured when a capacity of the battery decreases to 80% or less of an initial capacity.

7. The battery pack according to claim 5, wherein the casing comprises a casing body having an opening and a cover plate, the cover plate is connected to the opening of the casing body to jointly define a sealed accommodating cavity, and the core is located inside the accommodating cavity;
    the thickness of the battery before expansion is a dimension of the cover plate along the first direction; and
    the thickness of the battery after expansion is a minimum value of a spacing between two imaginary parallel planes sandwiching the battery along the first direction.

8. The battery pack according to claim 7, wherein when the thickness of the battery after expansion is measured, an average thickness of the battery is calculated, n points on the casing body of the battery 100 are randomly selected according to a certain interval, thicknesses at the n points are respectively measured and recorded as $d_1$, $d_2$, $d_3$, . . . $d_n$, and the thickness of the battery after expansion is $d=(d_1+d_2+d_3+ \ldots d_n)/n$.

9. The battery pack according to claim 1, wherein the gap between two neighboring batteries is a gap between the two neighboring batteries during work or after work or before use; and the thickness of the battery is an initial thickness of the battery before use.

10. The battery pack according to claim 1, wherein the casing comprises a casing body having an opening and a cover plate, the cover plate is connected to the opening of the casing body to jointly define a sealed accommodating cavity, and the core is located inside the accommodating cavity; and
    the gap between two neighboring batteries comprises a first gap, the first gap is a minimum distance between two cover plates, which are located on the same side, of the two neighboring batteries, and the thickness of the battery is a dimension of the cover plate along the first direction.

11. The battery pack according to claim 1, wherein the casing comprises a casing body having an opening and a cover plate, the cover plate is connected to the opening of the casing body to jointly define a sealed accommodating cavity, and the core is located inside the accommodating cavity;
    the casing has two opposite first surfaces along the first direction; and
    the gap between two neighboring batteries comprises a second gap, and the second gap is a minimum spacing between two first surfaces, which are opposite to each other, of casings of the two neighboring batteries; and the thickness of the battery is a dimension of the cover plate along the first direction.

12. The battery pack according to claim 11, wherein a second gap of the battery before use is greater than a second gap of the battery after use.

13. The battery pack according to claim 1, wherein a has a value in a range of 5.8%-17.5%.

14. The battery pack according to claim 1, wherein a length of the battery extends along a second direction, and the length of the battery is 400-2500 mm; and the second direction is different from the first direction.

15. The battery pack according to claim 1, wherein a plurality of cores are packaged in the casing, the plurality of cores are divided into several core groups, and the core groups are connected in series.

16. The battery pack according to claim 15, wherein a plurality of cores in the same core group are connected in parallel.

17. The battery pack according to claim 15, wherein a packaging film is sleeved outside each of the core groups.

18. The battery pack according to claim 1, wherein a packaging film is further disposed between the casing and the core, and the core is packaged in the packaging film.

19. A vehicle, comprising a battery pack, the battery pack comprising a plurality of batteries, wherein:
a thickness of each battery extends along a first direction, and the plurality of batteries are successively arranged along the first direction to form a battery sequence,
the batteries each comprise a casing and a core within the casing,
a gap exists between two neighboring batteries and is configured to meet a requirement for free expansion of the battery, a ratio of the gap to the thickness of the battery is c, and c satisfies the following relational expression: c/a is greater than 0.15 and less or equal to 0.5, wherein a represents an expansion rate of the battery.

20. A battery pack, comprising a plurality of batteries arranged in a sequence in a thickness direction of the battery, each battery including a casing and a core within the casing, wherein: two neighboring batteries have a gap configured to meet a requirement for free expansion of the battery, a ratio of the gap to a thickness of the battery is c, and c satisfies the following relational expression: c/a is greater than 0.15 and less or equal to 0.5, wherein a represents an expansion rate of the battery.

* * * * *